United States Patent [19]

Stahl

[11] Patent Number: 6,049,764
[45] Date of Patent: Apr. 11, 2000

[54] METHOD AND SYSTEM FOR REAL-TIME CONTROL OF ANALYTICAL AND DIAGNOSTIC INSTRUMENTS

[75] Inventor: Douglas C. Stahl, Claremont, Calif.

[73] Assignee: City of Hope, Duarte, Calif.

[21] Appl. No.: 08/968,087

[22] Filed: Nov. 12, 1997

[51] Int. Cl.[7] .................................................. G01N 37/00
[52] U.S. Cl. .......................... 702/183; 700/104; 714/26; 706/60; 702/31
[58] Field of Search ............................... 702/183, 31, 32; 700/104; 714/26; 706/60

[56] References Cited

U.S. PATENT DOCUMENTS

| | | | |
|---|---|---|---|
| 5,025,391 | 6/1991 | Filby et al. | 364/513 |
| 5,365,514 | 11/1994 | Hershey et al. | 370/17 |
| 5,446,681 | 8/1995 | Gethner et al. | 364/554 |
| 5,463,543 | 10/1995 | Wagner | 364/141 |
| 5,717,614 | 2/1998 | Shah et al. | 364/579 |
| 5,724,272 | 3/1998 | Mitchell et al. | 364/579 |
| 5,784,275 | 7/1998 | Sojoodi et al. | 364/191 |
| 5,847,955 | 12/1998 | Mitchell et al. | 364/191 |

FOREIGN PATENT DOCUMENTS 0694825  1/1996  European Pat. Off. .

OTHER PUBLICATIONS

National Instruments Instrumentation Reference and Catalog. pp. 2–39 to 2–40, 1995.

M.A. Maloof, "AMRS: A Prototype of an Analytical Method Recommendation System", PROCEEDINGS IEEE, SOUTHEASTERN.92, vol. 2, Apr. 12, 1992, pp. 479–481.

P. Dersin, "Process Diagnostics Beyond Real–Time: The Detective Expert System", Proceedings of the Sixth Annual Control Engineers Conference, May 19, 1987, pp. 264–276.

I. Dickinson, "Model–Based Reasoning in Analytical Instrumentation", Laboratory Robotics and Automation, vol. 5, No. 2, Apr. 1993, pp. 85–96.

A. Harper et al., "Intelligent Instrumentation", Journal of Research of the National Bureau of Standards, vol. 90, No. 6, Nov. 1985, pp. 453–464.

T. Ryan et al., "An Expert System Network for Supercritical Fluid Technologies", Intell. Instrum. Comp., vol. 8, No. 3, May 1990, pp. 109–119.

*Primary Examiner*—Patrick Assouad
*Attorney, Agent, or Firm*—Rothwell, Figg, Ernst & Kurz

[57] ABSTRACT

Apparatus and method for real-time control of an analytical or diagnostic instrument, including a host computer including an operating system and at least one driver or application program for controlling the operation of the analytical or diagnostic instrument, an expert system containing a knowledge base of various states of the analytical or diagnostic instrument, relationships between data generated by the instrument and the states of the instrument, and actions to be taken in response to the existence of a certain state based on received data from the instrument, an interface between the operating system and the expert system for retrieving the data generated by the instrument through interaction with the operating system, providing the data to the expert system, and providing instructions for the driver or the application program to the operating system based on a response of the expert system to the data.

9 Claims, 3 Drawing Sheets

METHOD AND SYSTEM FOR REAL-TIME CONTROL OF ANALYTICAL AND DIAGNOSTIC INSTRUMENTS

GOVERNMENT RIGHTS STATEMENT

This invention was made with government support under Grant No. NIH RR-06217 awarded by the National Institutes of Health. The government has certain rights in the invention.

BACKGROUND OF THE INVENTION

1. Field of the Invention

This invention relates generally to computer-implemented control of dedicated hardware, and in particular relates to real-time computer control of the operation of analytical and diagnostic instrumentation.

2. Description of Background Art

Conventional analytical and diagnostic instrumentation is not designed to evaluate incoming data and implement modifications to operational parameters in real time, i.e., during the collection of such data by the instruments. Typically, a human operator must periodically analyze the incoming data, and, if the incoming data does not meet the operator's expectations regarding the characteristics of data to be received, the operator must reprogram the instrumentation, restart the data acquisition process, and continue to periodically monitor the values of incoming data. This has resulted in very inefficient operation of such instrumentation, which has required multiple restarts of the data gathering process before all data of interest is obtained.

One such known analytical system combines tandem mass spectrometry with on-line liquid chromatography for the analysis of complex biological samples. Such a system generates massive amounts of data which are dealt with using large-scale post acquisition data processing systems based on a "collect-everything-and-sort-it-out-later" approach. While this approach may be economically feasible from a computing power and data storage capacity point of view, it fails to address the following important factors:

The quality of experimental results is directly related to the expertise of the individuals performing the experiments. This relationship is even more significant as the complexity of analytical techniques increases. As a consequence, operators with less than expert level knowledge tend to overlook important information needed to determine the optimal course of a complex analysis.

There is generally a significant gap between problem domain expertise and instrument operation expertise. Experts involved in biological analysis must translate their analytical goals into low-level instrument control commands that may be unfamiliar to them. Conversely, experts in instrument operation may perform incomplete or inadequate experiments because of an insufficient understanding of the information that is necessary to achieve the analytical goals.

Instruments that are physically coupled to perform tandem separations are not logically linked to interact effectively and efficiently toward the solution of problems.

SUMMARY OF THE INVENTION

The present invention provides an improvement to the prior art and allows real-time, automated control of the operation of analytical and diagnostic instruments by extracting or retrieving data generated by the instruments while an analysis or diagnosis is in progress, determining the relationships between such data and previously collected data and known states of such instrumentation, and altering the operation of the instrumentation in response to conclusions drawn from the determined relationships. In a preferred embodiment, the invention utilizes an expert system including a knowledge base of information regarding various states of the analytical or diagnostic instrumentation in use, and characteristics of data generated by the instrumentation.

In particular, the present invention provides a computer-implemented method for real-time control of a computer application program-controlled analytical or diagnostic instrument, including the steps of retrieving output data from a data system of the analytical or diagnostic instrument during operation of the instrument, inputting the retrieved data to an expert system, processing the inputted retrieved data in the expert system, providing operating instructions based on the results of the processing, and inputting the operating instructions to the computer application program or driver controlling the analytical or diagnostic instrument to control further operation of the instrument.

According to another aspect, the invention provides a system for real-time control of an analytical or diagnostic instrument, including a host computer including an operating system and at least one application program or driver for controlling the operation of the analytical or diagnostic instrument, an expert system containing a knowledge base of various states of the analytical or diagnostic instrument, relationships between data generated by the instrument and the states of the instrument, and actions to be taken in response to the existence of a certain state based on received data from the instrument, an interface between the operating system and the expert system for retrieving the data generated by the instrument through interaction with the operating system, providing the data to the expert system, and providing instructions for the application program or driver to the operating system based on a response of the expert system to the data.

BRIEF DESCRIPTION OF THE DRAWINGS

The present invention will become more fully understood from the detailed description given hereinbelow in conjunction with the accompanying drawings, which are given by way of illustration only and are not limitative of the present invention, and wherein.

DETAILED DESCRIPTION OF THE PREFERRED EMBODIMENT

Figure 1:
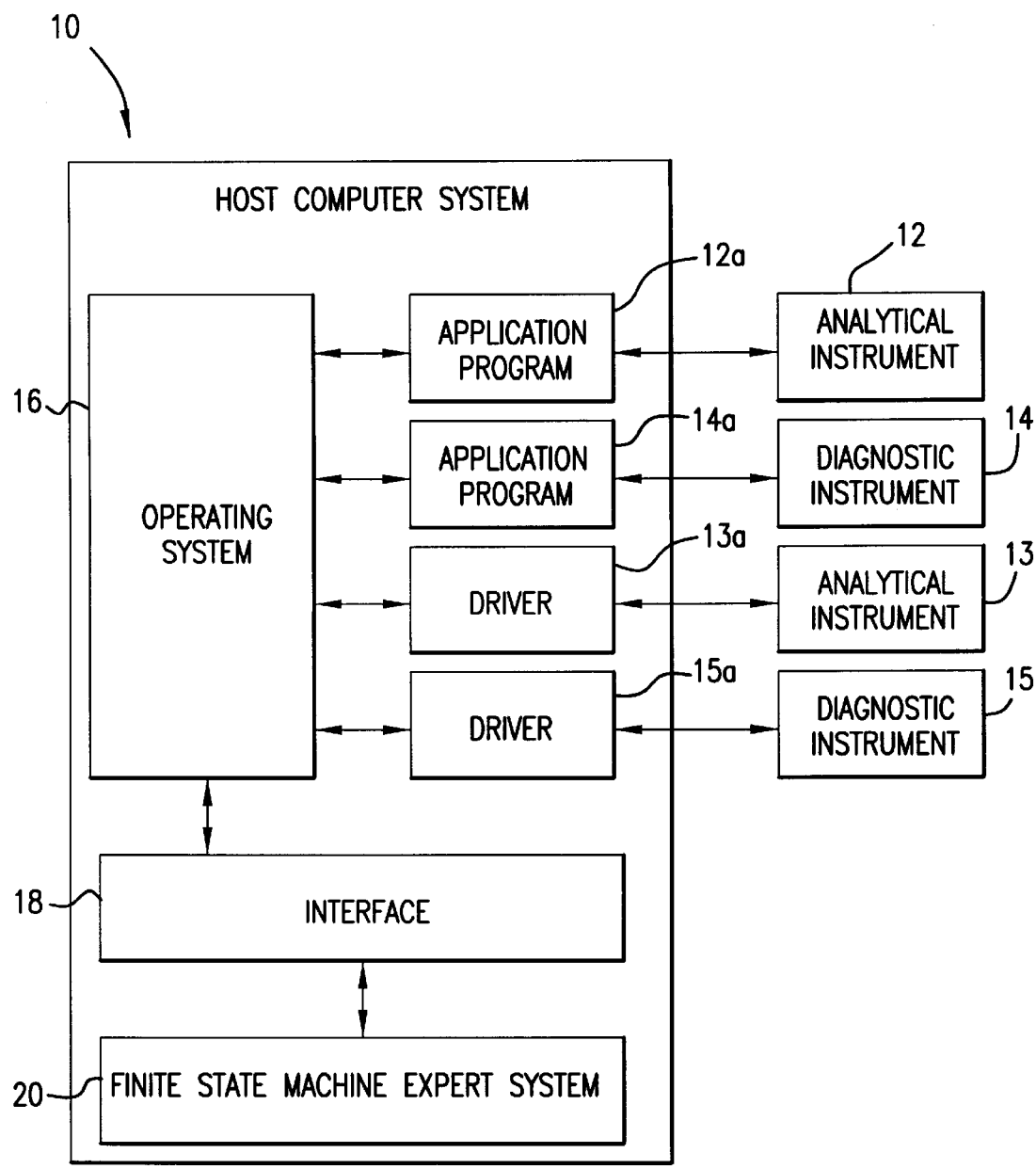
FIG. 1 is a block diagram of a system for controlling analytical and diagnostic instrumentation according to one preferred embodiment of the invention.

Referring to FIG. 1, according to one preferred embodiment, the invention provides a host computer system 10 for controlling one or more analytical instruments 12, 13 and/or diagnostic instruments 14, 15. Such instruments are well known in the art and are commercially available; for this reason no further details regarding such instruments is necessary or appropriate. An example of such an analytical instrument is a mass spectrometric instrument used for identifying and analyzing a variety of chemical compounds. Such an instrument is described in U.S. Pat. No. 4,008,388, incorporated herein by reference.

Each instrument is controlled either by a respective commercial application program 12a, 14a, or driver 13a, 15a running on the host computer system under an appropriate operating system 16 (such as Microsoft Windows 95, Windows NT, Apple Mac OS, or UNIX). According to the invention, an expert system such as a Finite State Machine (FSM) 20 is provided in the host computer system. FSMs are generally known in the art, and one such example is described in U.S. Pat. No. 5,623,680, also incorporated herein by reference. FSM 20 contains a knowledge base for each of the instruments 12, 14. The knowledge base includes a number of possible states of each instrument, wherein each state represents a particular analytical or diagnostic situation, the appropriate response to the situation, and the next state to be considered given the transition from one state to another.

An interface module 18 is provided to interact between the operating system 16 and the expert system 20. The interface 18 queries the operating system regarding incoming analytical or diagnostic data from the instrument to its application program or driver, and provides such extracted data to the expert system 20 for analysis.

Figure 2:
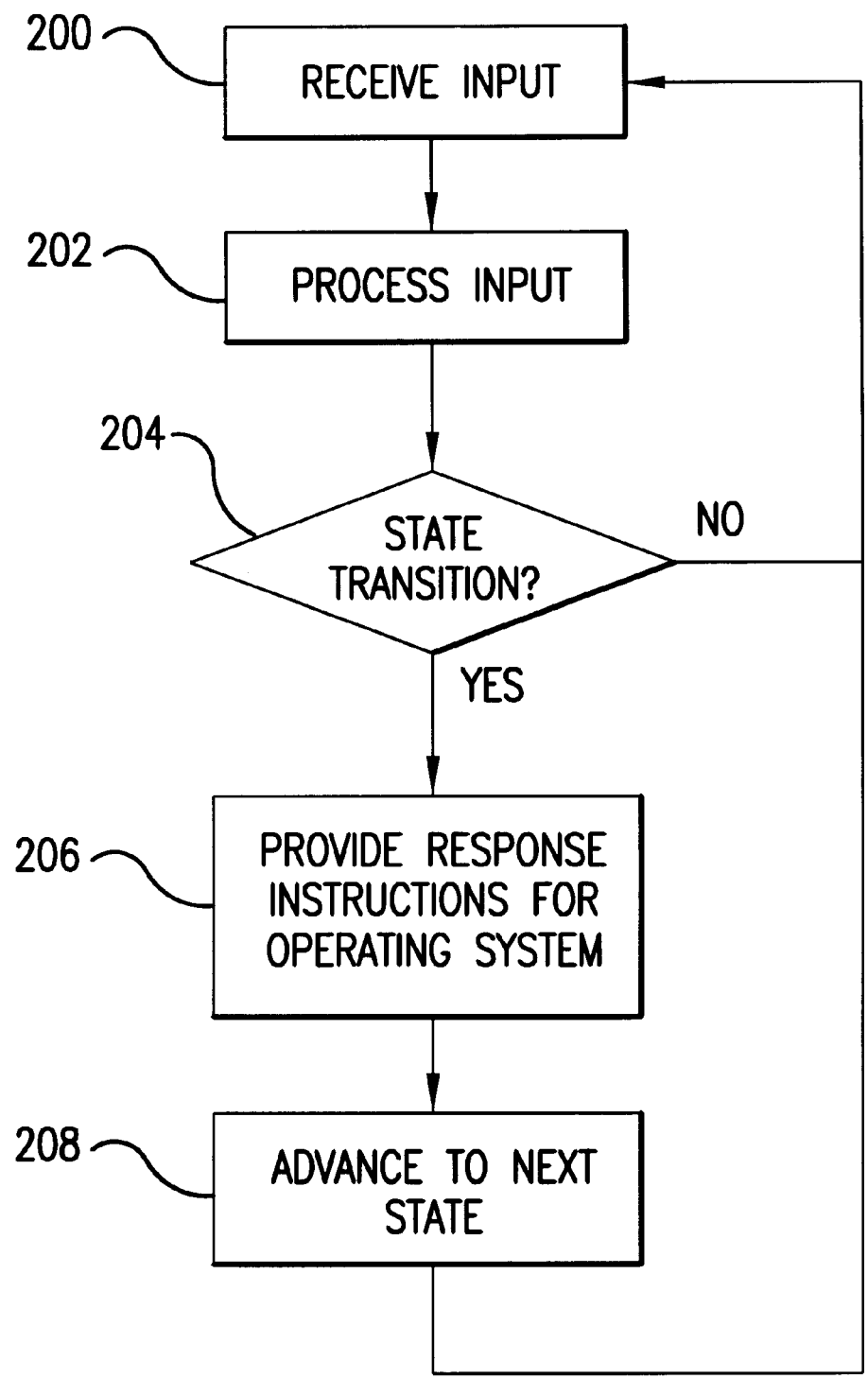
FIG. 2 is a flow diagram of the operation of an expert system according to one preferred embodiment of the invention.

FIG. 2 illustrates the operation of the expert system 20. At step 200, the system waits for the reception of input data from the operating system via the interface. Once data is received, it is processed at step 202 in conjunction with the stored knowledge base. Upon completion of data analysis, it is determined at step 204 whether a state transition has occurred. If a transition has not occurred, the system waits for reception of additional data by returning to step 200. If the result of processing indicates that a transition has occurred, the system proceeds to step 206 in which appropriate instructions responsive to the existence of a state transition as indicated by the data analysis are formulated. The system then advances to the next state, and returns to step 200.

Figure 3:
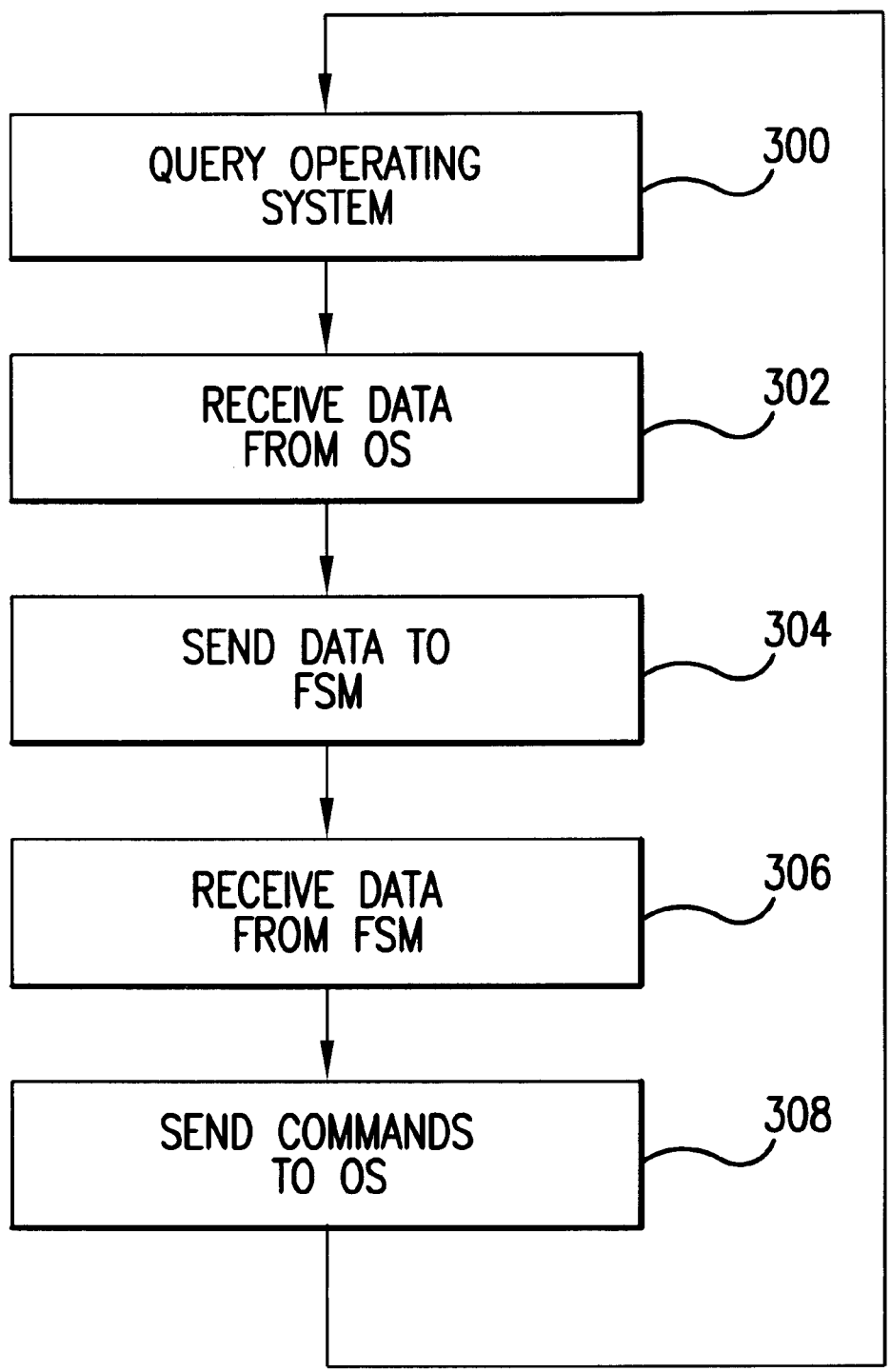
FIG. 3 is a flow diagram of the operation of an interface module according to one preferred embodiment of the present invention.

FIG. 3 shows the operation of the interface 18. At step 300, the interface queries the operating system as to ongoing activities of running application programs for the instruments 12, 14. For example, the operating system is able to track where the application program has written data, where its text windows are located, where its control icons are located, etc. The operating system also can be directed to execute parts of the application programs as though executed by a user such as by typing a command or activating an icon with a pointing device.

At step 302, the interface receives the requested data from the operating system, and at step 304, the interface presents the received data to the FSM expert system for analysis. Upon completion of analysis by the expert system, the interface receives the results of analysis at step 306. The analysis results are translated into appropriate commands for the operating system to interact with the corresponding application program or driver, and such commands are sent to the operating system at step 308.

According to a preferred embodiment, the interface module 18 may be implemented by using Microsoft Windows 32-bit Application Programmer's Interface (WIN32API). The FSM expert system may be implemented using LabVIEW Software Development Environment for Instrumentation.

Because the invention provides an interface between analytical instrumentation, computer data systems, computational resources such as databases or knowledge bases, and a number of other input and output signals, the invention may be used to modify and vary the operation and control of various commercially available analytical and diagnostic instrumentation without having to completely redesign such instrumentation. As an example, the present invention can be used to create a "network" of lower level instruments that are operated as a single high level tandem instrument. This instrument network then can be directed to perform advanced analytical and diagnostic work not previously possible through the use of the instruments individually.

Further advantages provided by the invention include: higher level interactions between instruments and users; delivery of complex sets of instructions to analytical and diagnostic instruments with far greater speed and accuracy than by human operator entry; iterative improvement of knowledge base data through detection of mismatches between actual and desired outcomes; and the ability to modify acquisition parameters of one instrument by using information obtained from another instrument through a logical link.

The invention having been thus described, it be apparent to those skilled in the art that the same may be varied in many ways without departing from the spirit and scope of the invention. Accordingly, any and all such modifications are intended to be covered by the following claims.

What is claimed is:

1. A computer-implemented method for real-time control of a driver or computer application program-controlled analytical or diagnostic instrument, comprising the steps of:

retrieving output data from a data system of the analytical or diagnostic instrument during operation of said instrument;

inputting the retrieved data to an expert system;

processing the inputted retrieved data in the expert system;

providing operating instructions based on the results of said processing; and inputting said operating instructions to the driver or computer application program controlling the analytical or diagnostic instrument to control further operation of said instrument.

2. A method as set forth in claim 1, wherein said expert system is a finite state machine.

3. A method as set forth in claim 1, wherein the step of retrieving output data comprises the step of querying an operating system of a computer running said driver or application program.

4. A method as set forth in claim 1, wherein the step of inputting operating instructions comprises the step of interfacing with an operating system of a computer running said driver or application program.

5. A system for real-time control of a driver- or computer application program-controlled analytical or diagnostic instrument, comprising:

a host computer containing said driver or computer application program;

means for retrieving output data from a data system of the analytical or diagnostic instrument during operation of said instrument;

means for inputting the retrieved data to an expert system;

means for processing the inputted retrieved data in the expert system;

means for providing operating instructions based on the results of said processing; and means for inputting said operating instructions to the driver or computer application program controlling the analytical or diagnostic instrument to control further operation of said instrument.

6. A system as set forth in claim 5, wherein said expert system is a finite state machine.

7. A system as set forth in claim 5, wherein said means for retrieving output data comprises means for querying an operating system of a computer running said driver or application program.

8. A system as set forth in claim 5, wherein said means for inputting operating instructions comprises means for interfacing with an operating system of a computer running said driver or application program.

9. A system for real-time control of an analytical or diagnostic instrument, comprising:

a host computer including an operating system and at least one driver or application program for controlling the operation of the analytical or diagnostic instrument;

an expert system containing a knowledge base of various states of the analytical or diagnostic instrument, relationships between data generated by said instrument and said states, and actions to be taken in response to the existence of a certain state based on received data from said instrument;

an interface between said operating system and said expert system for retrieving said data generated by said instrument through interaction with said operating system, providing said data to said expert system, and providing instructions for said driver or application program to said operating system based on a response of said expert system to said data.

* * * * *